(12) United States Patent
Hsieh et al.

(10) Patent No.: US 9,706,547 B2
(45) Date of Patent: Jul. 11, 2017

(54) METHOD OF HANDLING COMMUNICATION OPERATIONS AND RELATED COMMUNICATION DEVICE

(71) Applicant: Industrial Technology Research Institute, Hsinchu (TW)

(72) Inventors: Chia-Wen Hsieh, New Taipei (TW); Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 58 days.

(21) Appl. No.: 14/156,427

(22) Filed: Jan. 15, 2014

(65) Prior Publication Data

US 2014/0198752 A1 Jul. 17, 2014

Related U.S. Application Data

(60) Provisional application No. 61/753,399, filed on Jan. 16, 2013, provisional application No. 61/856,769, filed on Jul. 22, 2013.

(51) Int. Cl.
*H04W 72/04* (2009.01)
*H04L 1/18* (2006.01)
*H04L 5/00* (2006.01)

(52) U.S. Cl.
CPC ....... *H04W 72/0446* (2013.01); *H04L 1/1893* (2013.01); *H04L 5/0055* (2013.01); *H04L 1/1896* (2013.01)

(58) Field of Classification Search
CPC .............................................. H04W 72/0446
See application file for complete search history.

(56) References Cited

U.S. PATENT DOCUMENTS

| | | | | |
|---|---|---|---|---|
| 2013/0322235 A1* | 12/2013 | Khoryaev | ............ | H04W 24/10 370/229 |
| 2014/0078941 A1* | 3/2014 | Seo | ........................ | H04L 1/1822 370/280 |
| 2015/0173024 A1* | 6/2015 | Seo | ..................... | H04W 52/146 370/329 |

FOREIGN PATENT DOCUMENTS

| | | | | |
|---|---|---|---|---|
| CN | 101610578 A | 12/2009 | | |
| CN | 102523627 A | 6/2012 | | |
| WO | WO 2012/128558 A2 * | 9/2012 | ............... | H04L 1/18 |

\* cited by examiner

*Primary Examiner* — Hoon J Chung
(74) *Attorney, Agent, or Firm* — Winston Hsu

(57) ABSTRACT

A method of handling a communication operation for a communication device configured with a first cell comprises the steps of performing a first communication operation in a subframe via the first cell, if a direction of the subframe determined according to a uplink (UL)/downlink (DL) configuration of the first cell and a direction of the subframe determined according to a reference UL/DL configuration are the same; and stopping the first communication operation in the subframe via the first cell, if the direction of the subframe determined according to the UL/DL configuration of the first cell and the direction of the subframe determined according to the reference UL/DL configuration are the different.

19 Claims, 13 Drawing Sheets

FIG. 11

METHOD OF HANDLING COMMUNICATION OPERATIONS AND RELATED COMMUNICATION DEVICE

CROSS REFERENCE TO RELATED APPLICATIONS

This application claims both the benefit of U.S. Provisional Application No. 61/753,399, filed on Jan. 16, 2013 and entitled "Method and Apparatus to Handle Time-Division Duplex (TDD) Configuration" and the benefit of U.S. Provisional Application No. 61/856,769, filed on Jul. 22, 2013 and entitled "Method and Apparatus to Handle Time-Division Duplex (TDD) Configuration".

BACKGROUND OF THE INVENTION

1. Field of the Invention

The application relates to a method utilized in a wireless communication system, and more particularly, to a method of handling communication operations.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

The CA is introduced to the LTE-A system by which more than one cells can be aggregated to achieve a wide-band transmission. The CA increases bandwidth flexibility by aggregating the cells. When a UE is configured with the CA, the UE has the ability to receive and/or transmit packets via one or multiple cells to increase throughput.

Different from the LTE/LTE-A system operating in a frequency-division duplexing (FDD) mode (or simply FDD system), directions of subframes of a frequency band in the LTE/LTE-A system operating in a time-division duplexing (TDD) mode (or simply TDD system) may be different. That is, the subframes in the same frequency band are divided into UL subframes, downlink (DL) subframes and special subframes according to the UL/DL configuration specified in the 3GPP standard.

FIG. 1 is a table 10 of the UL/DL configuration with subframes and corresponding directions. In FIG. 1, 7 UL/DL configurations are shown, wherein each of the UL/DL configurations indicates a set of directions (i.e., transmission directions) for 10 subframes, respectively. Each subframe is indicated with respective subframe number (i.e., subframe index) in FIG. 1. In detail, "U" means that the subframe is a UL subframe where UL data is transmitted, and "D" means that the subframe is a DL subframe where DL data is transmitted. "S" means that the subframe is a special subframe where control information and maybe data (according to the special subframe configuration) is transmitted, and the special subframe can also be seen as the DL subframe in the present invention. Note that the eNB may configure a UL/DL configuration to a UE via a higher layer signaling (e.g., System Information Block Type 1 (SIB1)) or a physical layer signaling (e.g., DL control information (DCI)).

As stated previously, a UE may perform a communication operation via multiple cells, when the UE is configured with the CA, wherein the communication operation may be a transmission (from the UE to the network) or a reception (from the network to the UE), e.g., of a packet or a message. However, it may happen that UL/DL configurations of the cells are different, e.g., when an inter-band CA is configured to the UE. It may also happen that the cells jointly operate in different modes, e.g., in time-division duplexing (TDD) mode and/or frequency-division duplexing (FDD) mode. In the above situations, directions of a subframe (e.g., which are determined according to the UL/DL configurations of the cells) may be different, and it is difficult for the UE to decide how to perform the communication operation in the subframe. The problem is especially severe for a half-duplex UE which can only perform one of the transmission and the reception at the same time (e.g., in the same subframe). In another example, the UE may fail to transmit or receive a hybrid automatic repeat request (HARQ) feedback when one or more communication operations cannot be performed, i.e., HARQ discontinuity.

Thus, the conflict caused by different UL/DL configurations of the cells is an important problem to be solved.

SUMMARY OF THE INVENTION

The present invention therefore provides a method and related communication device for handling communication operations to solve the abovementioned problem.

A method of handling a communication operation for a communication device configured with a first cell comprises the steps of performing a first communication operation in a subframe via the first cell, if a direction of the subframe determined according to uplink (UL)/downlink (DL) configuration of the first cell and a direction of the subframe determined according to a reference UL/DL configuration are the same; and stopping the first communication operation in the subframe via the first cell, if the direction of the subframe determined according to the UL/DL configuration of the first cell and the direction of the subframe determined according to the reference UL/DL configuration are the different.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 11-12 are schematic diagrams of UL/DL configurations with subframe indices according to an example of the present invention.

DETAILED DESCRIPTION

Figure 2:
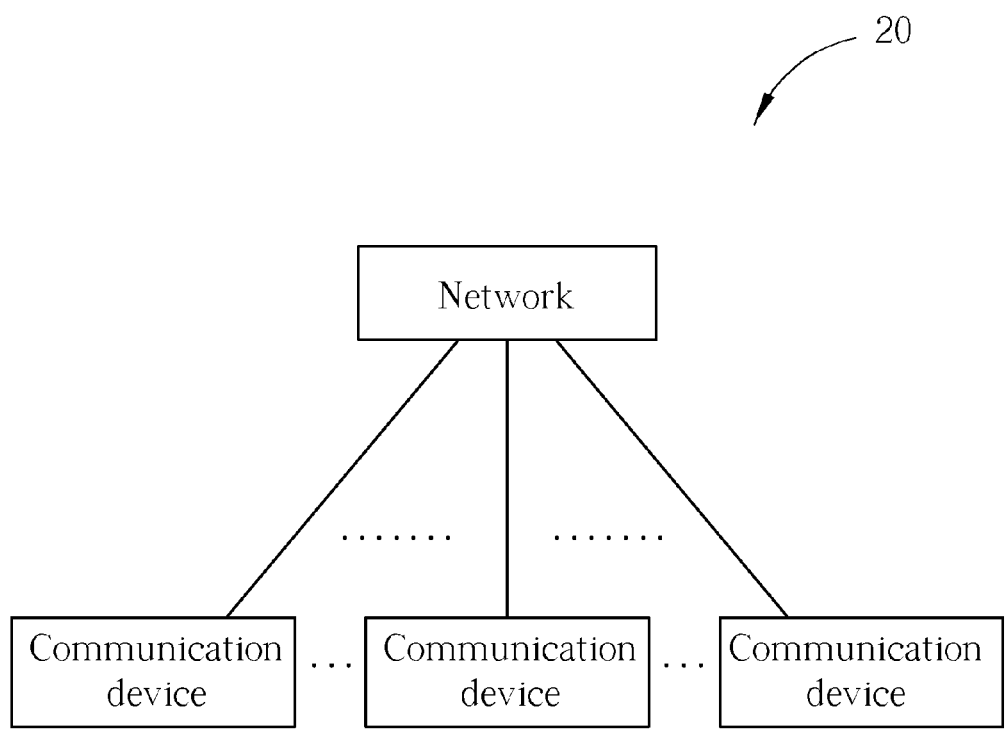
FIG. 2 is a schematic diagram of a wireless communication system according to an example of the present invention.

FIG. 2 is a schematic diagram of a wireless communication system 20 according to an example of the present invention. The wireless communication system 20 is briefly composed of a network including one or more cells and a plurality of communication devices. The wireless communication system 20 supports a time-division duplexing (TDD) mode and/or a frequency-division duplexing (FDD) mode. That is, the network and a communication device may communicate with each other by using uplink (UL) subframes and downlink (DL) subframes according to one or more UL/DL configurations. In addition, the wireless communication system 20 may support a carrier aggregation (CA). That is, the network and a communication device may communicate with each other via multiple cells including a primary cell and one or more secondary cells. For example, a communication device may communicate with the network via two cells, wherein the cells may be a TDD cell (i.e., operating in the TDD mode) and a FDD cell (i.e., operating in the FDD mode), respectively, or may be both TDD cells.

In FIG. 2, the network and the communication devices are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A communication device can be a user equipment (UE), a half-duplex UE, a mobile phone, a laptop, a tablet computer, an electronic book or a portable computer system but is not limited. Besides, the network and the communication device can be seen as a transmitter or a receiver according to direction, e.g., for an UL, the communication device is the transmitter and the network is the receiver, and for a DL, the network is the transmitter and the communication device is the receiver. More specifically, for the network, the direction of the transmission is DL, and the direction of the reception is UL. For the communication device, the direction of the transmission is UL, and the direction of the reception is DL.

Figure 3:
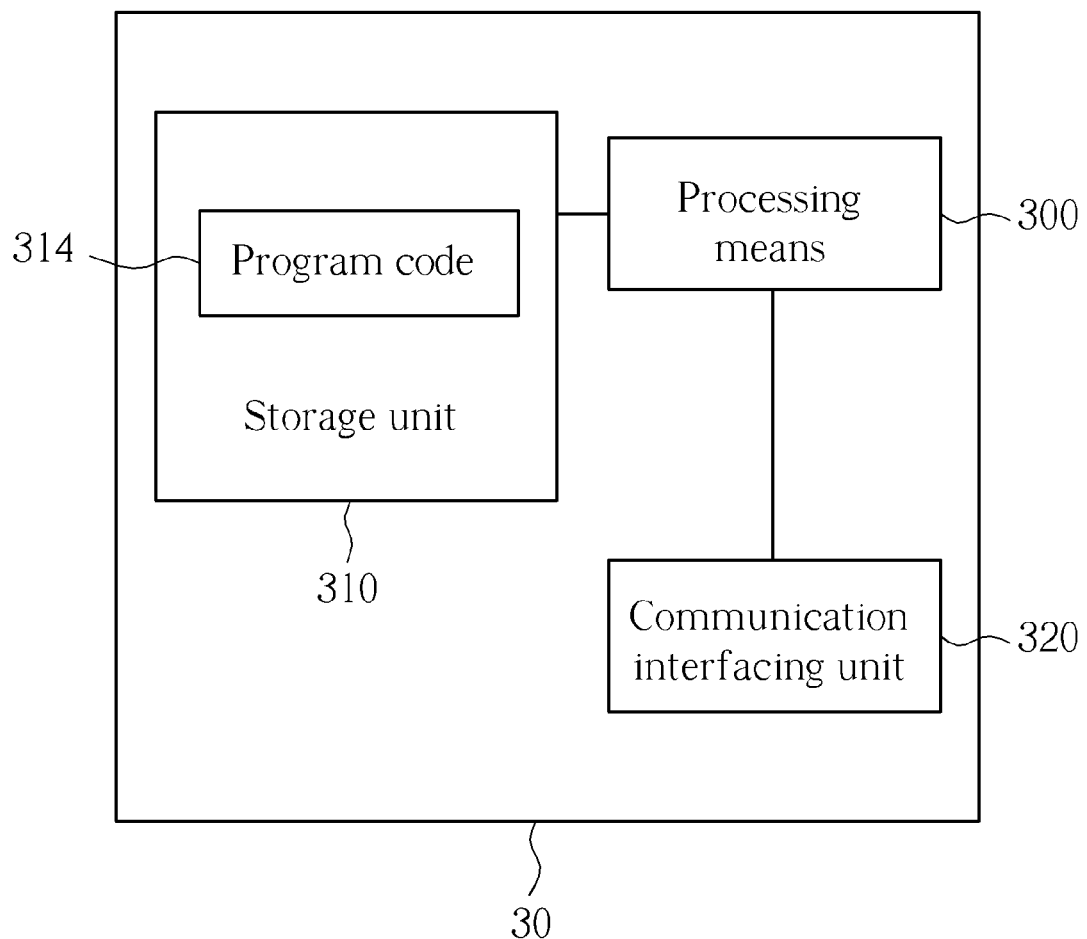
FIG. 3 is a schematic diagram of a communication device according to an example of the present invention.

FIG. 3 is a schematic diagram of a communication device 30 according to an example of the present invention. The communication device 30 can be a communication device or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
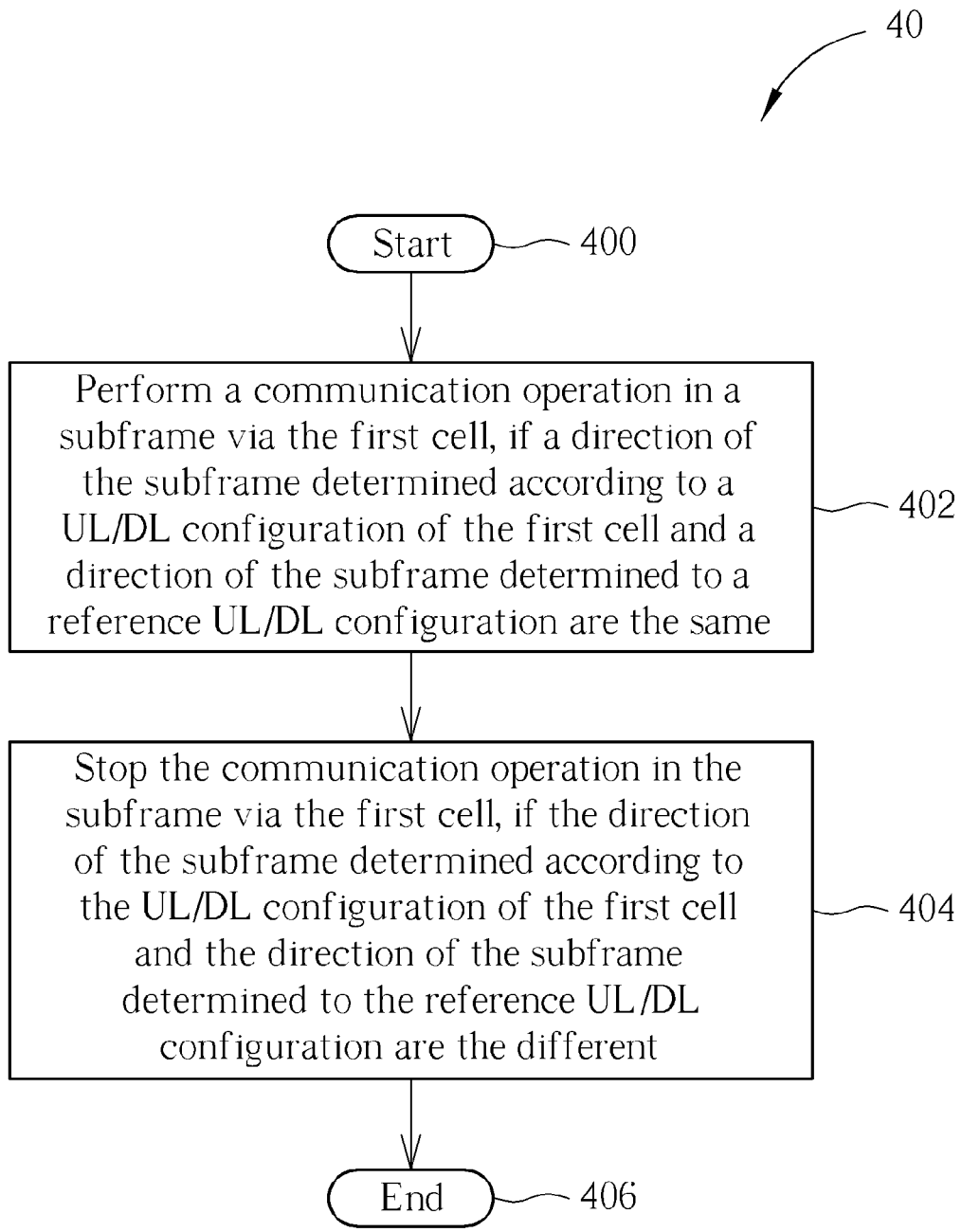
FIG. 4 is a flowchart of a process according to an example of the present invention.

FIG. 4 is a flowchart of a process 40 according to an example of the present invention. The process 40 can be utilized in a communication device shown in FIG. 2, for handling a communication operation. The communication device is configured with a first cell of the network. The process 40 may be compiled into the program code 314 and includes the following steps:

Step 400: Start.

Step 402: Perform a communication operation in a subframe via the first cell, if a direction of the subframe determined according to a UL/DL configuration of the first cell and a direction of the subframe determined to a reference UL/DL configuration are the same.

Step 404: Stop the communication operation in the subframe via the first cell, if the direction of the subframe determined according to the UL/DL configuration of the first cell and the direction of the subframe determined to the reference UL/DL configuration are the different.

Step 406: End.

According to the process 40, the communication device performs a communication operation in a subframe via the first cell, if a direction of the subframe determined according to a UL/DL configuration of the first cell and a direction of the subframe determined according to a reference UL/DL configuration are the same. In addition, the communication device stops the communication operation in the subframe via the first cell, if the direction of the subframe determined according to the UL/DL configuration of the first cell and the direction of the subframe determined according to the reference UL/DL configuration are the different. In other words, the communication device only performs the communication operation in the subframe, when the directions of the subframe determined according to the UL/DL configuration of the first cell and the reference UL/DL configuration do not conflict. Note that the communication operation mentioned above may be a transmission or a reception (e.g., of a message or a packet). Thus, the network can flexibly assign (i.e., configure) the communication operations in the subframes of the communication device, irrespective of the directions of the subframe determined according to the UL/DL configuration of the first cell. That is, the network can schedule resource (i.e., subframe) to the communication device flexibly, i.e., scheduling flexibility is improved.

In addition, the network may assign a reference UL/DL configuration with a specific DL ratio according to a demand of the communication device on DL traffic or other factors. For example, the network may assign a reference UL/DL configuration with a low DL ratio (i.e., with fewer DL subframes), if a demand of the communication device on DL traffic is low. In this situation, more DL subframes may be forbidden for performing receptions (e.g., decodings) according to the process 40, i.e., the DL subframes are "muted". In another example, the network may assign a reference UL/DL configuration with a high DL ratio (i.e., with more DL subframes), if a demand of the communication device on DL traffic is high. Thus, power consumption of the communication device can be reduced, e.g., when the DL ratio determined according to the reference UL/DL configuration is lower than the DL ratio determined according to the UL/DL configuration of the first cell. Moreover, additional switch points caused by subframes with different directions can also be reduced, when the reference UL/DL configuration is applied.

Realization of the process 40 is not limited to the above description.

For example, the communication device may be configured with a second cell of the network (i.e., configured with the CA) in addition to the first cell. In this situation, the communication device further performs another communication operation in the subframe via the second cell, when a direction of the subframe determined according to a UL/DL configuration of the second cell and the direction of the subframe determined according to the reference UL/DL configuration are the same. In addition, the communication device stops the another communication operation in the subframe via the second cell, when the direction of the subframe determined according to the UL/DL configuration of the second cell and the direction of the subframe determined according to the reference UL/DL configuration are the different. That is, the communication device only performs the communication operation in the subframe, when the directions of the subframe determined according to the UL/DL configuration of the second cell and the reference UL/DL configuration do not conflict. Thus, DL ratios of the first cell and the second cell can be configured by selecting a proper reference UL/DL configuration. The following examples may be applied to the first communication operation and/or the second communication operation mentioned above.

Note that types of the first cell and the second cell mentioned above are not limited. For example, the first cell and the second cell may be time-division duplexing (TDD) cells, e.g., the CA configured to the communication device is an inter-band CA. In another example, the first cell is a primary cell and the second cell is a secondary cell, or the first cell is a secondary cell and the second cell is a primary cell In addition, the first cell may be a TDD cell and the second cell may be a frequency-division duplexing (FDD) cell, or the first cell may be a FDD cell and the second cell may be a TDD cell. That is, the communication device may perform a TDD-FDD joint operation. In this situation, two types of UL/DL configurations can be considered for the FDD cell: a UL/DL configuration with only UL subframes and a UL/DL configuration with only DL subframes.

Figure 1:
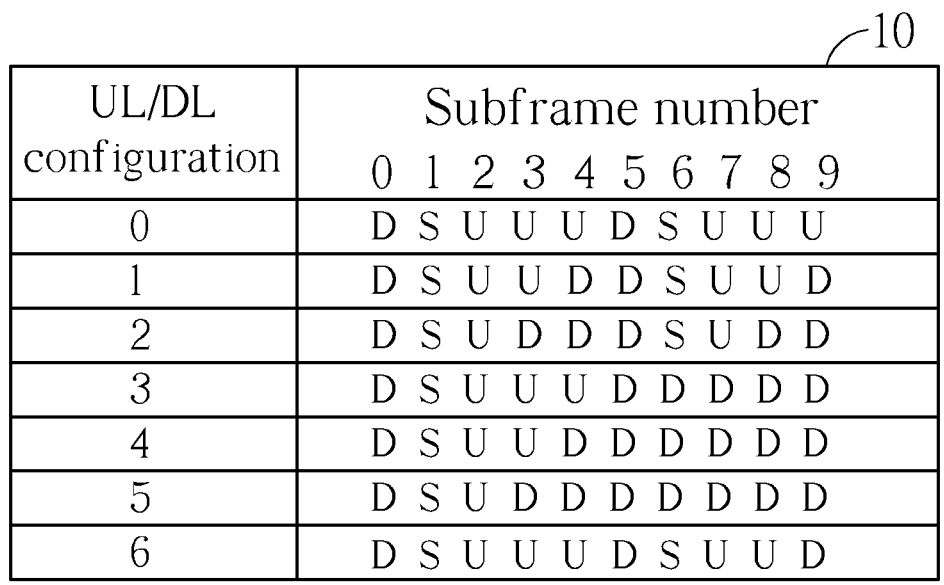
FIG. 1 is a table of the UL/DL configuration with subframes and corresponding directions.
Figure 5:
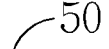
FIG. 5 is a table of the UL/DL configuration with subframes and corresponding directions according to an example of the present invention.

FIG. 5 is table 50 of the UL/DL configuration with subframes and corresponding directions according to an example of the present invention. Comparing with FIG. 1, two new UL/DL configurations 7 and 8 are added for the FDD cell in FIG. 5, wherein the UL/DL configuration 7 includes only UL subframes, and the UL/DL configuration 8 includes only DL subframes. For example, the communication device may be configured with two cells including a TDD cell and a FDD cell with only UL subframes for performing transmissions (i.e., for the UL), while the DL is not limited. That is, the TDD cell and the FDD cell may be configured with the UL/DL configurations 3 and 7, respectively. In another example, the communication device may be configured with two cells including a TDD cell and a FDD cell with only DL subframes for performing receptions (i.e., for the DL) while the UL is not limited. That is, the TDD cell and the FDD cell may be configured with the UL/DL configurations 5 and 8, respectively. The above two examples can also be combined for providing another example.

On the other hand, a method according to which a communication device obtains the reference UL/DL configuration is not limited. For example, the communication device may receive information (e.g., indicator or value) of the reference UL/DL configuration in a higher layer signaling (e.g., radio resource control (RRC) signaling) or a physical layer signaling (e.g., DL control information (DCI) signaling) transmitted by the network. Note that, in general, the physical layer signaling is transmitted more fast/frequently than the higher layer signaling. Thus, dynamic traffic adaptation can be provided by using reference UL/DL configurations carried by the physical layer signaling. In another example, the communication device may receive information of the reference UL/DL configuration in a communication device-specific signaling (i.e., specific for a communication device) or a group-specific signaling (i.e., specific for a group of communication devices) transmitted by the network. In another example, the communication device may receive information of the reference UL/DL configuration in a unicast, a multicast or a broadcast transmitted by the network.

Figure 6:
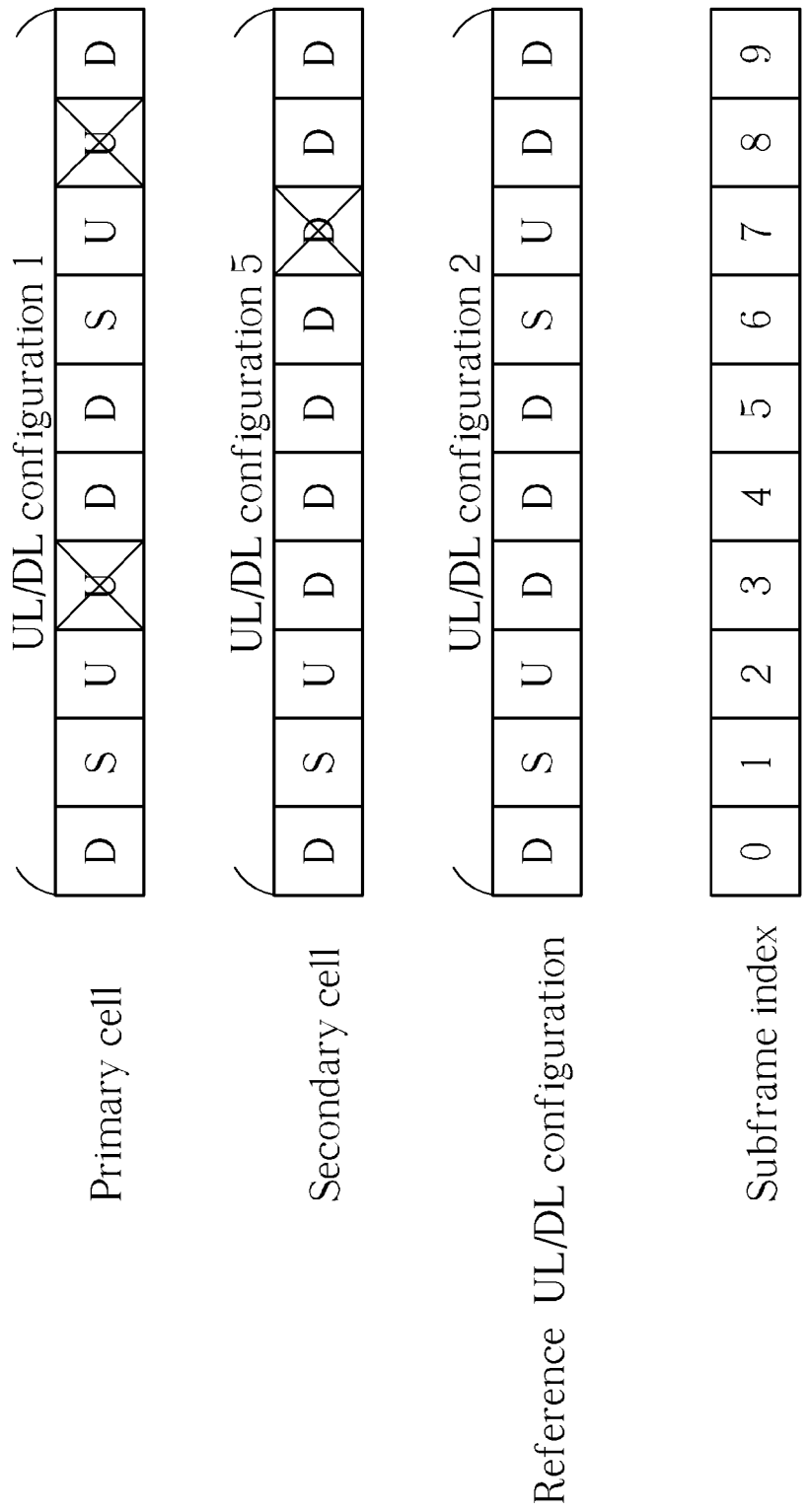
FIGS. 6-9 are schematic diagrams of UL/DL configurations with subframe indices according to an example of the present invention.

FIG. 6 is a schematic diagram of UL/DL configurations with subframe indices according to an example of the present invention. As shown in FIG. 6, UL/DL configurations of a primary cell and a secondary cell are UL/DL configurations 1 and 5, respectively, and the reference UL/DL configuration is a UL/DL configuration 2. UL subframes, DL subframes and special subframes are indicated by respective subframe indices. According to the previous description, the communication device can perform one or more communication operations in subframes 0-2, 4-7 and 9 via the primary cell, because directions of the subframes 0-2, 4-7 and 9 determined according to the UL/DL configuration 1 are the same as directions of the subframes 0-2, 4-7 and 9 determined according to the reference UL/DL configuration, respectively. The communication device stops performing any communication operation in the subframes 3 and 8 via the primary cell, because directions of the subframes 3 and 8 determined according to the UL/DL configuration 1 are different from directions of the subframes 3 and 8 determined according to the reference UL/DL configuration, respectively. In addition, the communication device can perform one or more communication operations in subframes 0-6 and 8-9 via the secondary cell, because directions of the subframes 0-6 and 8-9 determined according to the UL/DL configuration 5 are the same as directions of the subframes 0-6 and 8-9 determined according to the reference UL/DL configuration, respectively. The communication device stops performing any communication operation in subframe 7 via the secondary cell, because direction of the subframe 7 determined according to the UL/DL configuration 5 is different from direction of the subframe 7 determined according to the reference UL/DL configuration. More specifically, the subframes 0, 1, 4-6 and 9 can be seen as non-conflicting DL subframes for the primary cell, and the subframes 0, 1, 3-6, 8 and 9 can be seen as the non-conflicting DL subframes for the secondary cell. Similarly, the subframes 2 and 7 can be seen as the non-conflicting UL subframes for the primary cell, and the subframe 2 can be seen as the non-conflicting UL subframe for the secondary cell. For example, the communication device can perform transmissions in the subframe 2 via the primary cell and the secondary cell simultaneously. In another example, the communication device only performs receptions in the subframe 3 via the secondary cell. A DL ratio of the reference UL/DL configuration is nearly 80% in FIG. 6. In other examples, UL/DL configurations such as UL/DL configurations 0, 1 and 5 with DL ratios 40%, 60% and 90% may also be used as the reference UL/DL configuration according to a demand of the communication device on the DL traffic or other factors.

Figure 7:
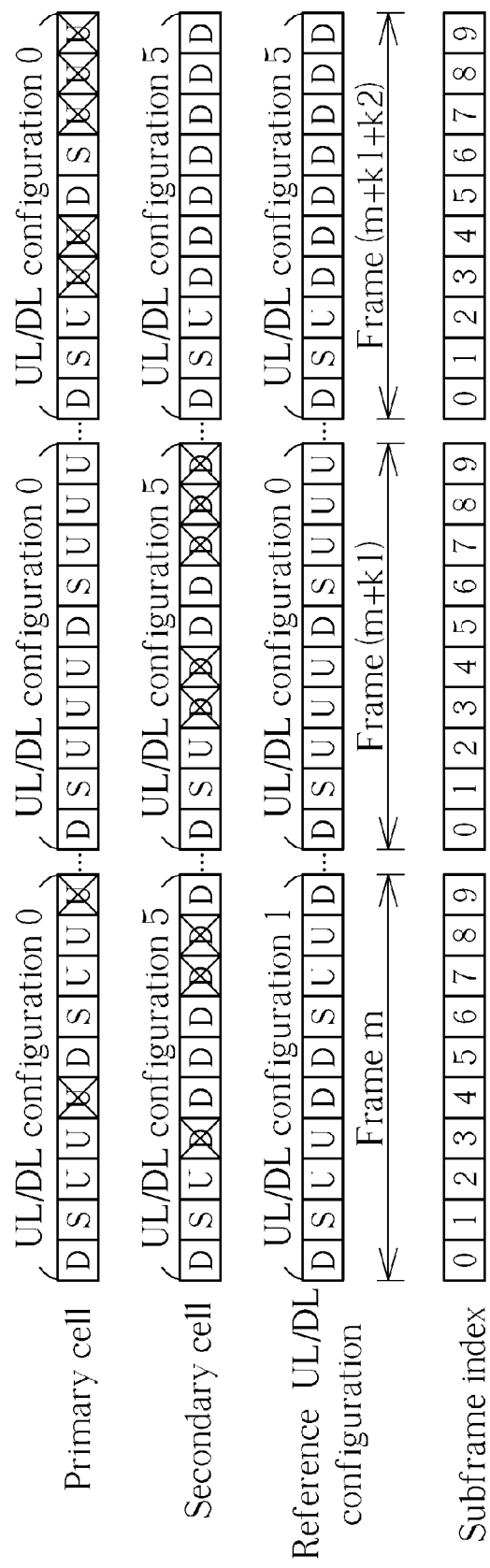

FIG. 7 is a schematic diagram of UL/DL configurations with subframe indices according to an example of the present invention. As shown in FIG. 7, UL/DL configurations of a primary cell and a secondary cell are UL/DL configurations 0 and 5, respectively, in all subframes of the frames considered, i.e., frames m, (m+k1) and (m+k1+k2). In the present example, the reference UL/DL configuration is configured as UL/DL configurations 1, 0 and 5 in the frames m, (m+k1) and (m+k1+k2), respectively, to adapt to traffic characteristics rapidly. According to the previous description, for the frame m, the communication device stops performing any communication operation in the subframes 4 and 9 via the primary cell, because directions of the subframes 4 and 9 determined according to the UL/DL configuration 0 are different from directions of the subframes 4 and 9 determined according to the reference UL/DL configuration (i.e., the UL/DL configuration 1), respectively. In addition, for the frame (m+k1), the communication device can perform one or more communication operations in all subframes via the primary cell, because directions of all subframes determined according to the UL/DL configuration 0 are the same as directions of all subframes determined according to the reference UL/DL configuration (i.e., the UL/DL configuration 0), respectively. In this situation, information of the reference UL/DL configuration may be transmitted to the communication device via a physical layer signaling (which is usually transmitted dynamically), for the communication device to use the reference UL/DL configuration in time. Detailed operations of the communication device in each of the frames m, (m+k1) and (m+k1+k2) (or even in frames between these frames) can be referred to the previous description, and are not narrated herein.

On the other hand, even if a UL/DL configuration of a cell and a reference UL/DL configuration are configured (e.g., determined) to the communication device, a UL/DL configuration (hereafter HARQ UL/DL configuration) for transmitting a DL HARQ feedback is to be determined (e.g., by the communication device or by the network), wherein the DL HARQ feedback may correspond to at least one reception in a previous subframe. Thus, timing for transmitting the DL HARQ feedback can be determined according to the HARQ UL/DL configuration.

According to the present invention, the communication device may transmit the DL HARQ feedback according to the UL/DL configuration of the cell (i.e., the HARQ UL/DL configuration is determined as the UL/DL configuration of the cell), if for each UL subframe of the UL/DL configuration of the cell, a UL subframe with a subframe index corresponds to a UL subframe of the reference UL/DL configuration with the subframe index. In addition, the communication device may transmit the DL HARQ feedback according to the reference UL/DL configuration (i.e., the HARQ UL/DL configuration is determined as the reference UL/DL configuration), if for each UL subframe of the reference UL/DL configuration, a UL subframe with a subframe index correspond to a UL subframe of the UL/DL configuration of the cell with the subframe index.

Figure 8:
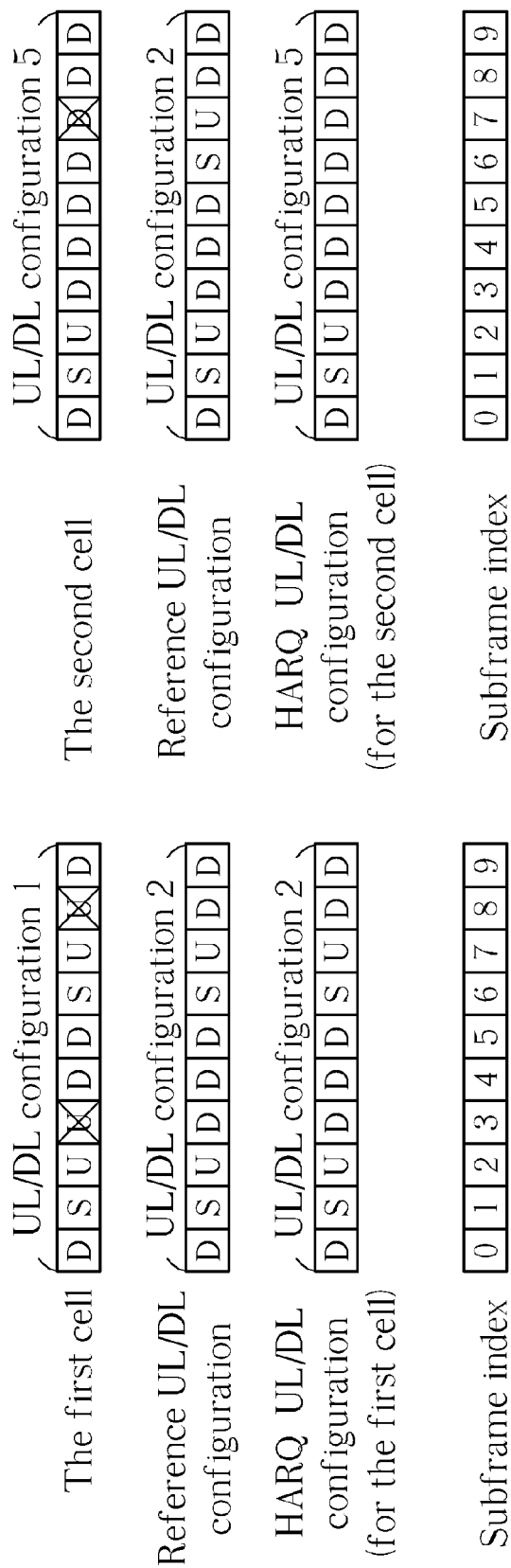

FIG. 8 is a schematic diagram of UL/DL configurations with subframe indices according to an example of the present invention. As shown in FIG. 8, the communication device is configured with two cells, UL/DL configurations of the cells are the UL/DL configurations 1 and 5, respectively, and the reference UL/DL configuration is the UL/DL configuration 2. In this situation, the communication device may determine that the HARQ UL/DL configuration is the UL/DL configuration 2, when the first cell with the UL/DL configuration 1 is considered. Accordingly, the communication device transmits the DL HARQ feedback of the first cell according to the UL/DL configuration 2. The communication device may determine that the HARQ UL/DL configuration is the UL/DL configuration 5, when the second cell with the UL/DL configuration 5 is considered. Accordingly, the communication device transmits the DL HARQ feedback of the second cell according to the UL/DL configuration 5. The communication device may determine that the HARQ UL/DL configuration is the UL/DL configuration 5, when the cells are both considered. Accordingly, the communication device transmits the DL HARQ feedback of both cells according to the UL/DL configuration 5.

In another example, the communication device may transmit a DL HARQ feedback according to a HARQ UL/DL configuration, if for each non-conflicting DL subframe of the UL/DL configuration of the cell, a non-conflicting DL subframe with a subframe index corresponds to a DL subframe of the HARQ UL/DL configuration with the same subframe index, wherein whether a DL subframe is non-conflicting is determined according to the UL/DL configuration of the cell and the reference UL/DL configuration. Note that the HARQ UL/DL configuration can be cell-specific (e.g., applied for a specific cell) or can be common (e.g., applied for more than one cells). When the HARQ UL/DL configuration is applied, the communication device transmits the DL HARQ feedback corresponding to a non-conflicting DL subframe in a non-conflicting UL subframe.

Figure 9:
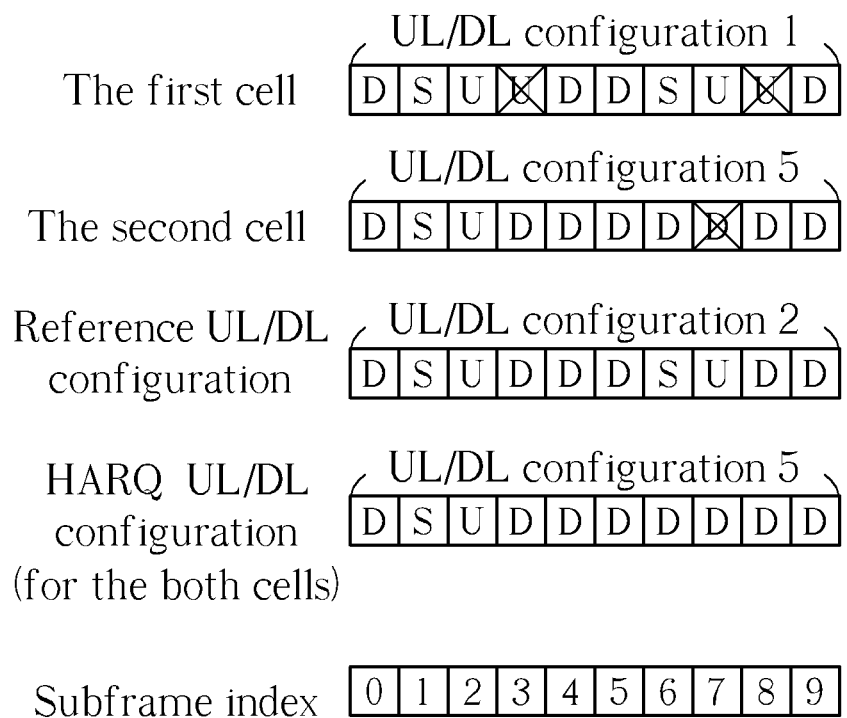

FIG. 9 is a schematic diagram of UL/DL configurations with subframe indices according to an example of the present invention. As shown in FIG. 9, the communication device is configured with two cells, UL/DL configurations of the cells are the UL/DL configurations 1 and 5, respectively, and the reference UL/DL configuration is the UL/DL configuration 2. In this situation, the communication device may determine that the HARQ UL/DL configuration is the UL/DL configuration 5 according to the above description. Accordingly, the communication device transmits the DL HARQ feedback of either one of the cells according to the UL/DL configuration 5.

Figure 10:
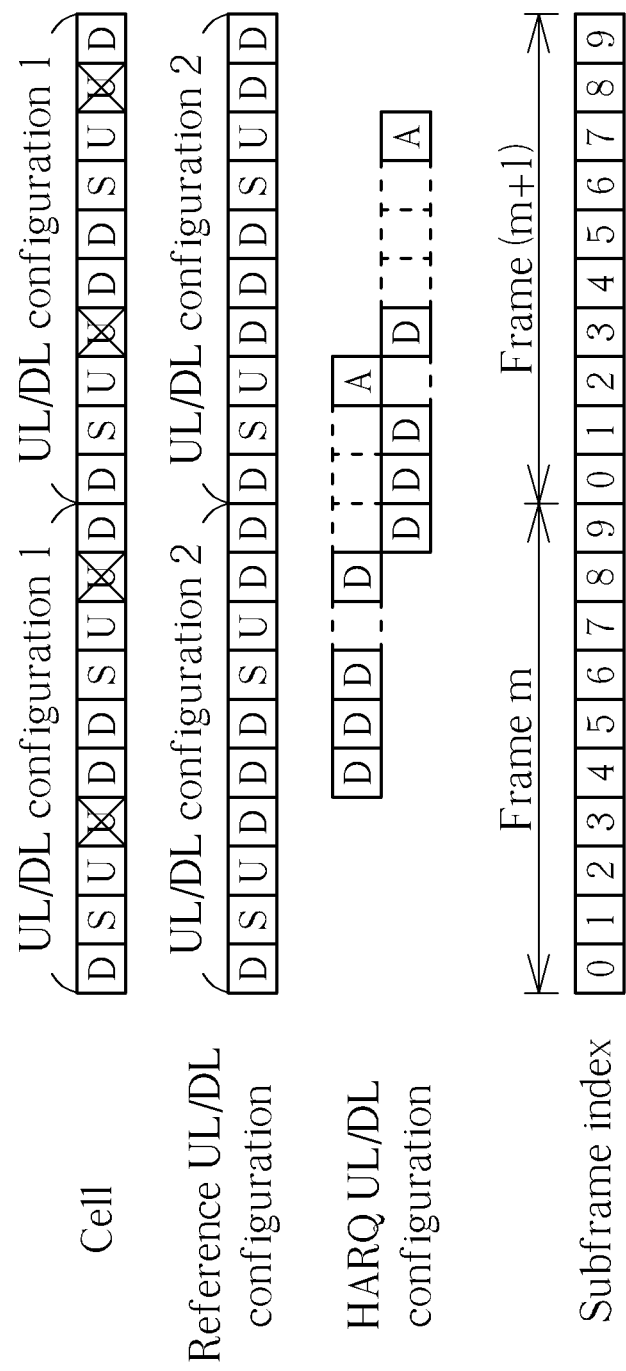
FIG. 10 is a schematic diagram of timelines of DL HARQ feedbacks of UL/DL configurations according to an example of the present invention.

FIG. 10 is a schematic diagram of timelines of DL HARQ feedbacks of UL/DL configurations according to an example of the present invention, and is used for illustrating the above examples. As shown in FIG. 10, a UL/DL configuration of a cell (e.g., a primary cell or a secondary cell) configured to the communication device is the UL/DL configuration 1, and the communication device performs a communication operation (e.g., a transmission or a reception of a packet) according to the reference UL/DL configuration (i.e., the UL/DL configuration 2). According to the above description, the communication device transmits a DL HARQ feedback according to the HARQ UL/DL configuration which is the UL/DL configuration 2. For example, the communication device may transmit a DL HARQ feedback in the subframe 2 of the frame (m+1) for responding one or more receptions (e.g., of the packets) in the subframes 4, 5, 6 and 8 of the frame m. In one example, the receptions are performed via a physical DL shared channel (PDSCH). In addition, the communication device stops performing any communication operation in the subframes 3 and 8 via the cell, because directions of the subframes 3 and 8 determined according to the UL/DL configuration 1 are different from directions of the subframes 3 and 8 determined according to the reference UL/DL configuration, respectively.

On the other hand, even if a UL/DL configuration of a cell and a reference UL/DL configuration are configured (e.g., determined) to the communication device, a UL/DL configuration for receiving a UL HARQ feedback (hereafter HARQ UL/DL configuration) is to be determined (e.g., by the communication device or by the network), wherein the UL HARQ feedback may correspond to at least one transmission in a previous subframe. Thus, timing for receiving the UL HARQ feedback can be determined according to the HARQ UL/DL configuration.

According to the present invention, the communication device may receive a UL HARQ feedback according to the UL/DL configuration of the cell (i.e., the HARQ UL/DL configuration is determined as the UL/DL configuration of the cell), if for each DL subframe of the UL/DL configuration of the cell, a DL subframe with a subframe index corresponds to a DL subframe of the reference UL/DL configuration with the subframe index. In addition, the communication device may receive the UL HARQ feedback according to the reference UL/DL configuration (i.e., the HARQ UL/DL configuration is determined as the reference UL/DL configuration), if for each DL subframe of the reference UL/DL configuration, a DL subframe with a subframe index correspond to a DL subframe of the UL/DL configuration of the cell with the subframe index.

Figure 11:
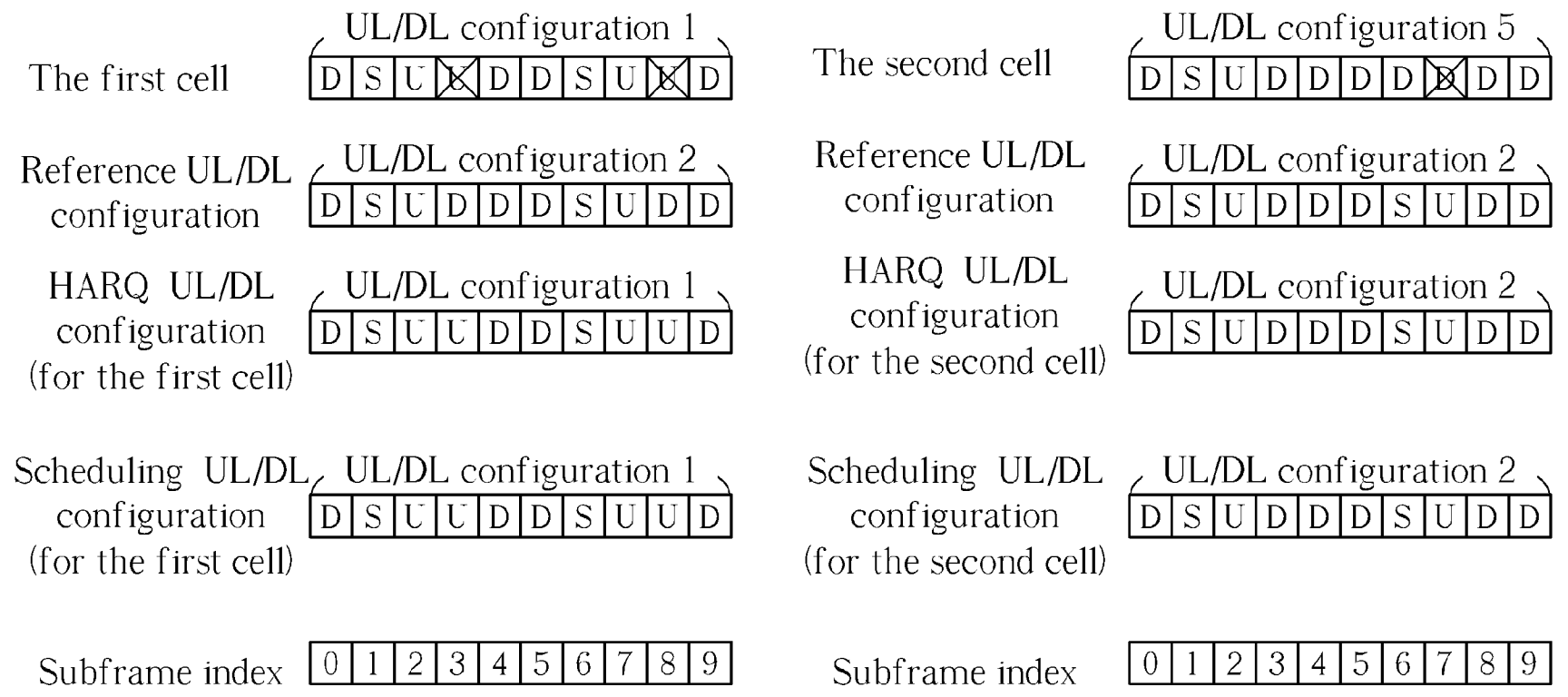

FIG. 11 is a schematic diagram of UL/DL configurations with subframe indices according to an example of the present invention. As shown in FIG. 11, the communication device is configured with two cells, UL/DL configurations of the cells are the UL/DL configurations 1 and 5, respectively, and the reference UL/DL configuration is the UL/DL configuration 2. In this situation, the communication device may determine that the HARQ UL/DL configuration is the UL/DL configuration 1, when the first cell with the UL/DL configuration 1 is considered. Accordingly, the communication device receives the UL HARQ feedback of the first cell according to the UL/DL configuration 1. The communication device may determine that the HARQ UL/DL configuration is the UL/DL configuration 2, when the second cell with the UL/DL configuration 5 is considered. Accordingly, the communication device receives the UL HARQ feedback of the second cell according to the UL/DL configuration 2. The communication device may determine that the HARQ UL/DL configuration is the UL/DL configuration 2, when the cells are both considered. Accordingly, the communication device receives the UL HARQ feedback of both cells according to the UL/DL configuration 2.

In another example, the communication device may receive a UL HARQ feedback according to a HARQ UL/DL configuration, if for each non-conflicting UL subframe of the UL/DL configuration of the cell, a non-conflicting UL subframe with a subframe index corresponds to a UL subframe of the HARQ UL/DL configuration with the same subframe index, wherein whether a UL subframe is non-conflicting is determined according to the UL/DL configuration of the cell and the reference UL/DL configuration. Note that the HARQ UL/DL configuration can be cell-specific (e.g., applied for a specific cell) or can be common (e.g., applied for more than one cells). When the HARQ UL/DL configuration is applied, the communication device receives the UL HARQ feedback corresponding to a non-conflicting UL subframe in a non-conflicting DL subframe.

Figure 12:
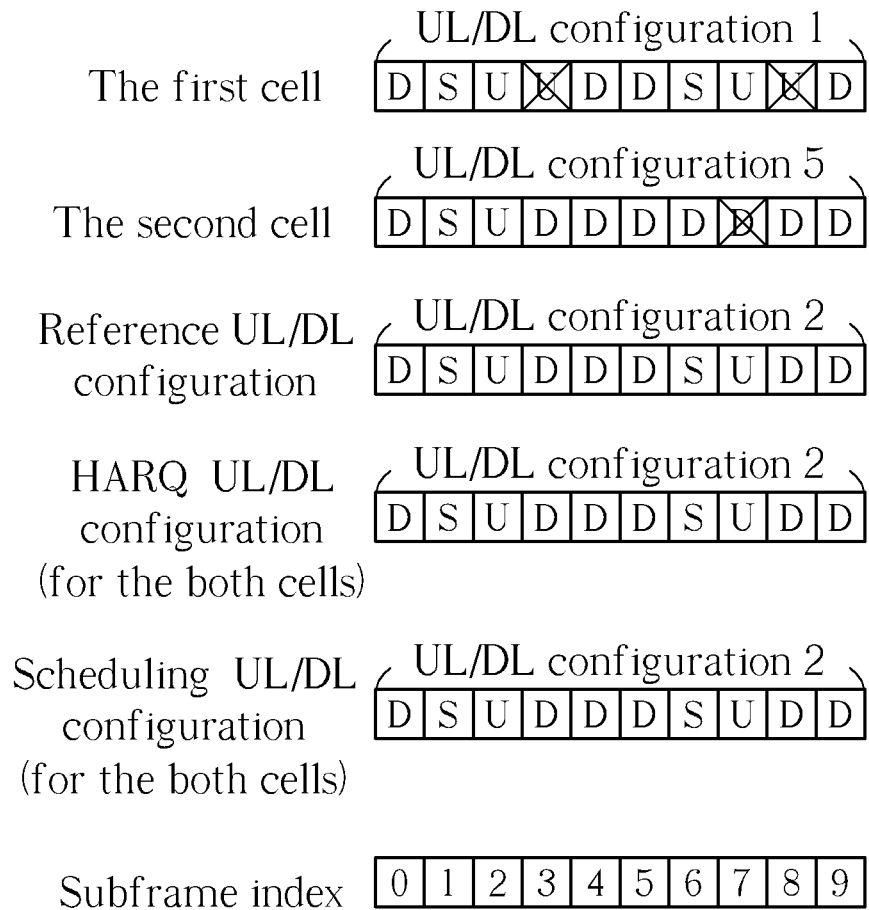

FIG. 12 is a schematic diagram of UL/DL configurations with subframe indices according to an example of the present invention. As shown in FIG. 12, the communication device is configured with two cells, UL/DL configurations of the cells are the UL/DL configurations 1 and 5, respectively, and the reference UL/DL configuration is the UL/DL configuration 2. In this situation, the communication device may determine that the HARQ UL/DL configuration is the UL/DL configuration 2, when the cells are both considered. Accordingly, the communication device receives the UL HARQ feedback of either one of the cells according to the UL/DL configuration 2.

On the other hand, even if a UL/DL configuration of a cell and a reference UL/DL configuration are configured (e.g., determined) to the communication device, a UL/DL configuration (hereafter scheduling UL/DL configuration) for performing a transmission (e.g., new transmission) is to be determined (e.g., by the communication device or by the network), wherein the transmission is triggered by a UL grant (e.g., in DCI) received in a previous subframe. Note that the transmission may be the transmission of data, message, signaling, and is not limited herein. Thus, timing for performing the transmission can be determined according to the scheduling UL/DL configuration.

According to the present invention, the communication device may perform a transmission according to the UL/DL configuration of the cell (i.e., the scheduling UL/DL configuration is determined as the UL/DL configuration of the cell), if for each DL subframe of the UL/DL configuration of the cell, a DL subframe with a subframe index corresponds to a DL subframe of the reference UL/DL configuration with the subframe index. In addition, the communication device may perform the transmission according to the reference UL/DL configuration (i.e., the scheduling UL/DL configuration is determined as the reference UL/DL configuration), if for each DL subframe of the reference UL/DL configuration, a DL subframe with a subframe index correspond to a DL subframe of the UL/DL configuration of the cell with the subframe index.

An example of determining the scheduling UL/DL configuration can be referred to the description related to FIG. 11. The communication device may determine that the scheduling UL/DL configuration is the UL/DL configuration 1, when the first cell with the UL/DL configuration 1 is considered. Accordingly, the communication device performs the transmission of the first cell according to the UL/DL configuration 1. The communication device may determine that the scheduling UL/DL configuration is the UL/DL configuration 2, when the second cell with the UL/DL configuration 5 is considered. Accordingly, the communication device performs the transmission of the second cell according to the UL/DL configuration 2. The communication device may determine that the scheduling UL/DL configuration is the UL/DL configuration 2, when the cells are both considered. Accordingly, the communication device performs the transmission of both cells according to the UL/DL configuration 2.

In another example, the communication device may perform a transmission according to a scheduling UL/DL configuration, if for each non-conflicting UL subframe of the UL/DL configuration of the cell, a non-conflicting UL subframe with a subframe index corresponds to a UL subframe of the scheduling UL/DL configuration with the same subframe index, wherein whether a UL subframe is non-conflicting is determined according to the UL/DL configuration of the cell and the reference UL/DL configuration. Note that the scheduling UL/DL configuration can be cell-specific (e.g., applied for a specific cell) or can be common (e.g., applied for more than one cells). When the scheduling UL/DL configuration is applied, the communication device performs the transmission corresponding to a non-conflicting UL subframe in a non-conflicting DL subframe.

As shown in FIG. 12, the communication device is configured with two cells, UL/DL configurations of the cells are the UL/DL configurations 1 and 5, respectively, and the reference UL/DL configuration is the UL/DL configuration 2. In this situation, the communication device may determine that the scheduling UL/DL configuration is the UL/DL configuration 2, when the cells are both considered. Accordingly, the communication device performs the transmission of either one of the cells according to the UL/DL configuration 2.

Figure 13:
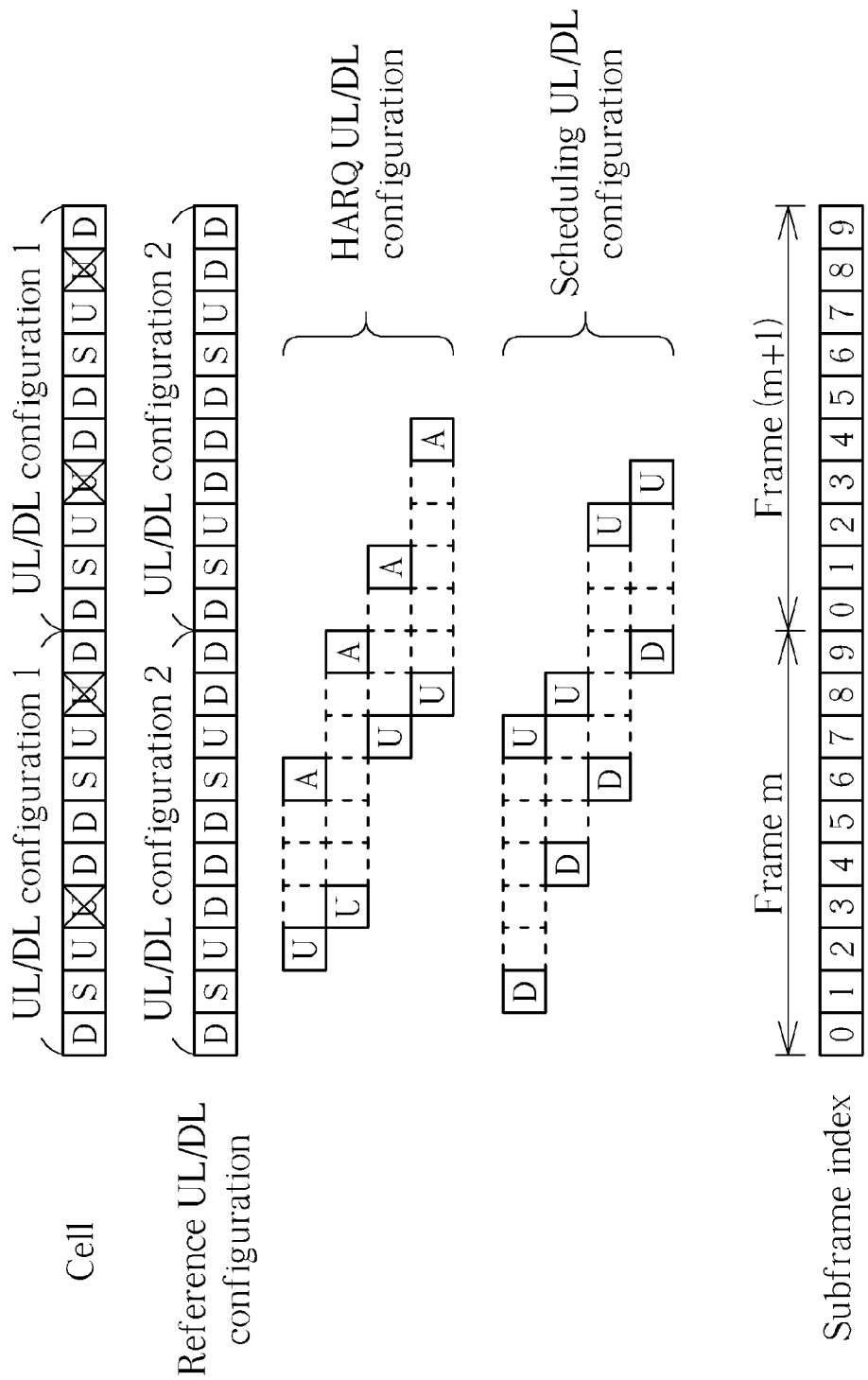
FIG. 13 is a schematic diagram of timelines of UL HARQ feedbacks and UL transmissions of UL/DL configurations according to an example of the present invention.

FIG. 13 is a schematic diagram of timelines of UL HARQ feedbacks and UL transmissions of UL/DL configurations according to an example of the present invention, and is used for illustrating the above examples. As shown in FIG. 13, a UL/DL configuration of a cell (e.g., a primary cell or a secondary cell) configured to the communication device is the UL/DL configuration 1, and the communication device performs a communication operation (e.g., a transmission or a reception of a packet) according to the reference UL/DL configuration which is the UL/DL configuration 2. According to the above description, the communication device may receive a UL HARQ feedback according to a HARQ UL/DL configuration which is the UL/DL configuration 1. For example, the communication device may receive a UL HARQ feedback in the subframe 6 of the frame m and the UL HARQ feedback corresponds to one or more transmissions (e.g., of the packets) in the subframe 2 of the frame m. In one example, the transmissions are performed via a physical UL shared channel (PUSCH). On the other hand, the communication device may perform a transmission (e.g., of data) according to a scheduling UL/DL configuration which is also the UL/DL configuration 1. For example, the communication device may perform a transmission in the subframe 7 of the frame m after receiving a UL grant in DCI of the subframe 1 of the frame m.

Please note that, a HARQ UL/DL configuration mentioned above can be determined by the network or be determined by the communication device. In another example, the HARQ UL/DL configuration can even be predetermined to avoid unnecessary computation or to avoid overhead for indicating the HARQ UL/DL configuration. For example, the HARQ UL/DL configurations for UL and DL HARQ feedbacks are predetermined to be the UL/DL configurations 0 and 5, respectively. Similarly, a scheduling UL/DL configuration mentioned above can be determined by the network, be determined by the communication device or be predetermined. In another example, the scheduling UL/DL configuration can even be predetermined to avoid unnecessary computation or to avoid overhead for indicating the scheduling UL/DL configuration. For example, the scheduling UL/DL configuration for a UL grant is predetermined to be the UL/DL configuration 0. In addition, HARQ UL/DL configurations for processing a UL HARQ feedback and a DL HARQ feedback may be different or the same according to the above examples.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method of handling communication operations for a communication device. Thus, the network can schedule resource (i.e., subframe) to a communication device flexibly, i.e., scheduling flexibility is improved. In addition, the network may assign a reference UL/DL configuration with a specific DL ratio according to a demand of the communication device on DL traffic or other factors. Thus, power consumption of the communication device may also be reduced by assigning proper a reference UL/DL configuration to the communication device. In addition, additional switch points caused by subframes with different directions can also be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a communication operation for a communication device configured with a first cell and a second cell of a network, the method comprising the steps of:

performing a first communication operation in a subframe via the first cell, if a direction of the subframe determined according to a uplink (UL)/downlink (DL) configuration of the first cell and a direction of the subframe determined according to a reference UL/DL configuration are the same; and stopping the first communication operation in the subframe via the first cell, if the direction of the subframe determined according to the UL/DL configuration of the first cell and the direction of the subframe determined according to the reference UL/DL configuration are different;

wherein the communication device receives information of the reference UL/DL configuration transmitted by the network, and the reference UL/DL configuration is different than both the UL/DL configuration of the first cell and a UL/DL configuration of the second cell.

2. The method of claim 1, wherein the first communication operation comprises the steps of:
transmitting a DL HARQ feedback according to the UL/DL configuration of the first cell, if for each UL subframe of the UL/DL configuration of the first cell, a UL subframe with a subframe index corresponds to a UL subframe of the reference UL/DL configuration with the subframe index; and
transmitting the DL HARQ feedback according to the reference UL/DL configuration, if for each UL subframe of the reference UL/DL configuration, a UL subframe with a subframe index correspond to a UL subframe of the UL/DL configuration of the first cell with the subframe index;
wherein the DL HARQ feedback corresponds to at least one reception in a previous subframe.

3. The method of claim 1, wherein the first communication operation comprises the steps of:
receiving a UL HARQ feedback according to the UL/DL configuration of the first cell, if for each DL subframe of the UL/DL configuration of the first cell, a DL subframe with a subframe index corresponds to a DL subframe of the reference UL/DL configuration with the subframe index; and
receiving the UL HARQ feedback according to the reference UL/DL configuration, if for each DL subframe of the reference UL/DL configuration, a DL subframe with a subframe index correspond to a DL subframe of the UL/DL configuration of the first cell with the subframe index;
wherein the UL HARQ feedback corresponds to at least one transmission in a previous subframe.

4. The method of claim 1, wherein the first communication operation comprises the steps of:
performing a transmission according to the UL/DL configuration of the first cell, if for each DL subframe of the UL/DL configuration of the first cell, a DL subframe with a subframe index corresponds to a DL subframe of the reference UL/DL configuration with the subframe index; and
performing the transmission according to the reference UL/DL configuration, if for each DL subframe of the reference UL/DL configuration, a DL subframe with a subframe index correspond to a DL subframe of the UL/DL configuration of the first cell with the subframe index;
wherein the transmission is triggered by a UL grant received in a previous subframe.

5. The method of claim 1, wherein the first communication operation comprises the step of:
transmitting a DL HARQ feedback according to a HARQ UL/DL configuration, if for each non-conflicting DL subframe of the UL/DL configuration of the first cell, a non-conflicting DL subframe with a subframe index corresponds to a DL subframe of the HARQ UL/DL configuration with the same subframe index;
wherein whether a DL subframe is non-conflicting is determined according to the UL/DL configuration of the first cell and the reference UL/DL configuration.

6. The method of claim 1, wherein the first communication operation comprises the step of:
receiving a UL HARQ feedback according to a HARQ UL/DL configuration, if for each non-conflicting UL subframe of the UL/DL configuration of the first cell, a non-conflicting UL subframe with a subframe index corresponds to a UL subframe of the HARQ UL/DL configuration with the same subframe index;
wherein whether a UL subframe is non-conflicting is determined according to the UL/DL configuration of the first cell and the reference UL/DL configuration.

7. The method of claim 1, wherein the first communication operation comprises the step of:
performing a transmission according to a scheduling UL/DL configuration, if for each non-conflicting UL subframe of the UL/DL configuration of the first cell, a non-conflicting UL subframe with a subframe index corresponds to a UL subframe of the scheduling UL/DL configuration with the same subframe index;
wherein whether a UL subframe is non-conflicting is determined according to the UL/DL configuration of the first cell and the reference UL/DL configuration.

8. The method of claim 1, wherein the communication device is configured with a second cell of the network and the method further comprises the steps of:
performing a second communication operation in the subframe via the second cell, when a direction of the subframe determined according to a UL/DL configuration of the second cell and the direction of the subframe determined according to the reference UL/DL configuration are the same; and
stopping the second communication operation in the subframe via the second cell, when the direction of the subframe determined according to the UL/DL configuration of the second cell and the direction of the subframe determined according to the reference UL/DL configuration are different.

9. The method of claim 8, wherein the first cell and the second cell are time-division duplexing (TDD) cells.

10. The method of claim 8, wherein the first cell is a primary cell and the second cell is a secondary cell.

11. The method of claim 8, wherein the first cell is a TDD cell and the second cell is a frequency-division duplexing (FDD) cell.

12. The method of claim 8, wherein the first cell is a FDD cell and the second cell is a TDD cell.

13. The method of claim 1, wherein the first cell is a TDD cell or a FDD cell.

14. The method of claim 1, wherein the first cell is a primary cell or a secondary cell.

15. The method of claim 1, wherein the communication device receives the information of the reference UL/DL configuration in a higher layer signaling or a physical layer signaling transmitted by the network.

16. The method of claim 1, wherein the communication device receives the information of the reference UL/DL configuration in a communication device-specific signaling or a group-specific signaling transmitted by the network.

17. The method of claim 1, wherein the communication device receives the information of the reference UL/DL configuration in a unicast, a multicast or a broadcast transmitted by the network.

18. The method of claim 1, wherein the communication device is a half-duplex communication device.

19. A communication device capable of handling a communication operation according claim 1.

* * * * *